John Gracie: Soldering Apparatus for Sheet Metal Cans.

No. 121,360.

Patented Nov. 28, 1871.

Witnesses:
R. Crenshaw
James I. Kay.

Inventor:
John Gracie,
by Bakewell, Christy & Kerr,
his Att'ys.

AM. PHOTO-LITHOGRAPHIC CO. N.Y. (OSBORNE'S PROCESS.)

UNITED STATES PATENT OFFICE.

JOHN GRACIE, OF PITTSBURG, PENNSYLVANIA.

IMPROVEMENT IN SOLDERING APPARATUS.

Specification forming part of Letters Patent No. 121,360, dated November 28, 1871.

*To all whom it may concern:*

Be it known that I, JOHN GRACIE, of Pittsburg, in the county of Allegheny and State of Pennsylvania, have invented a new and useful Improvement in Soldering Apparatus for Sheet-Metal Cans; and I do hereby declare the following to be a full, clear, and exact description thereof, reference being had to the accompanying drawing forming part of this specification, in which—

Figure 1:
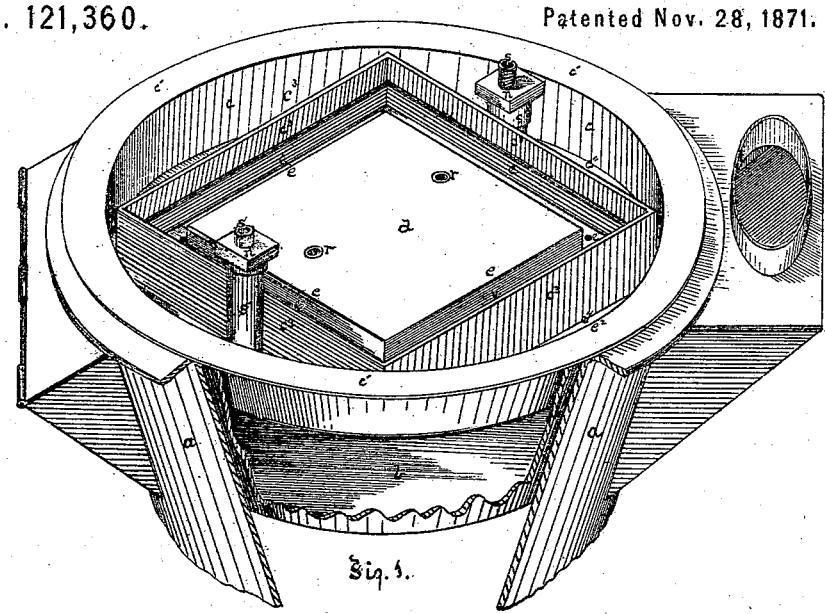
Figure 2:
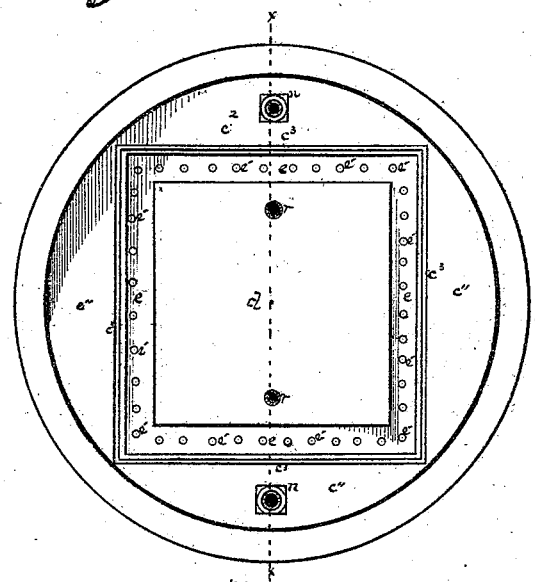
Figure 3:
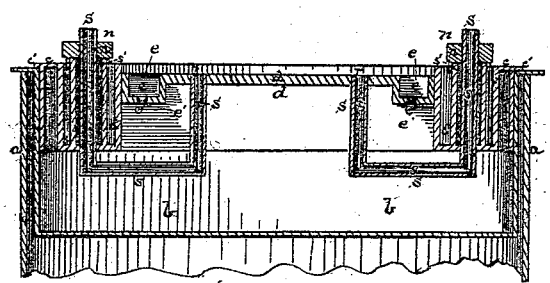

Figure 1 is a perspective view, partly in section, of a soldering-furnace furnished with my improved soldering devices. Fig. 2 is a plan view of the soldering-pan. Fig. 3 is a sectional view through the top of the furnace in the line $x\,x$, Fig. 2.

Like letters of reference indicate like parts in each.

In the apparatus heretofore in use for soldering sheet-metal cans by dipping the joint into molten solder various difficulties are encountered. An open shallow pan, channel, or trough is commonly used. If the dipping be done rapidly, the quantity of solder being small, it is rapidly lessened and becomes chilled. The dipping must then be suspended till a new supply is melted. If a little too much solder is melted at once, it runs over in the operation of dipping and is wasted.

By my improvement I provide an adjustable dipping-pan in connection with a comparatively large and deep melting-pan, so that a considerable quantity of solder can be melted at once and kept at the desired degree of fluidity, and so that the operation of dipping may go on continuously and rapidly. The adjustable dipping-pan is properly guided as it goes down on the surface of the solder, whereby, through perforations in the bottom of the dipping-pan, a uniform supply of solder is kept in the dipping-pan; and in such construction and in the combination therewith of suitable devices for facilitating the operations described consists the nature of my invention.

To enable others skilled in the art to make and use my invention, I will proceed to describe its construction and manner of use.

The sides or shell $a$ of the furnace or fire-chamber, as well as the grate or other device below for sustaining the fuel, may be of the usual or any suitable construction. In the upper part of the furnace, so as to be conveniently subject to the action of the heat, is a solder-pan, $b$, in which a considerable quantity of solder can be melted at once, and the supply kept up by occasional addition of cold solder without materially lowering the temperature and interfering with the dipping. To prevent loss of solder by oxidation I cover the pan $b$ with a cover, $c$, and plate $d$. The form of this cover $c$ may be varied somewhat, but I prefer to make it of a basin-form around its periphery, as at $c''$, so that it shall float on or in the molten solder below. The depth at which it should float, so as to keep a uniform depth of molten solder in the dipping-trough $e$, as presently to be described, may be regulated by superimposed weights or in other convenient way. The inside of the basin part $c''$ is surrounded by the walls $c^3$, the top of which are about even with the flange $c'$. The walls $c^3$ may inclose a square opening, as shown, or an opening of other desired form. In this opening I arrange a cover-plate, $d$, around the outer edge of which is the dipping-trough $e$, with a series of perforations or small holes, $e'$, in its bottom for supplying molten solder from the melting-pan $b$ below. The plate $d$ with its trough $e$ is made adjustable up and down inside the walls $c^3$, so that as the supply of molten solder in the melting-pan $b$ below is increased or lessened the dipping-pan $e$ may be correspondingly adjusted, whereby the solder in the dipping-pan $e$ can be kept at a uniform level however rapidly the dipping may be carried on. The dipping-pan $e$ should be of the size and form of the cans or can-joints to be soldered, and of sufficient depth below the level of the plate $d$ to receive the flanged joint to be soldered. For the purpose of effecting this adjustment, and also for the purpose of supplying air between the can and plate $d$, I insert the ends of a couple of pipes, $s$, in suitable openings, $r$, in the plate $d$; extend these pipes down, outward and upward outside the walls $c^3$, through the cover $c$, and on the upper projecting ends of such pipes arrange the adjusting screw-nuts $u$. This connection is such that as the nuts $u$ are turned up or down the pipes $s$, and with them the cover-plate $d$ and trough $l$, will be correspondingly raised or lowered, and the troughs $e$ adjusted and kept at such point of adjustment that a uniform depth of molten solder will always be kept in the trough *e* for convenience and rapidity in dipping and soldering the cans. Though not limiting myself thereto, I prefer to carry hollow posts *s'* from the depressed bottom of the cover *c* up to or above the level of the solder in the trough *e*, and pass the threaded ends of the air and adjusting pipes *s* through these hollow posts, as shown. The flange *c'* of the cover *c*, while not essential to the operation of my invention, may be arranged at such point above the bottom of the basin part *c''* as that, by resting on the top of the furnace-shell *a*, or edge of the pan *b*, it shall indicate when the supply of solder in the pan *b* needs replenishing; or such a flange may be arranged to keep the cover *c* always in one position, and the adjustments desired in the dipping-trough *e* be effected by the nuts *u*. For the nuts *u* other known devices for adjusting the pipes *s* may be employed, such as keys, levers, cams, &c. A floating-trough, *e*, for dipping and soldering the joints of cans, may, with suitable devices, such as flanged top, counterpoise-weights, &c., for keeping it at the proper depth in the molten solder, be used in connection with a melting-pan and air-pipes independently of the other devices connected therewith, as described; and such construction I include in my invention.

Hence, what I claim herein, and desire to secure by Letters Patent, is—

1. A covered melting-pan, with a dipping-trough arranged in the cover, substantially as and for the purposes set forth.

2. In connection with the covering devices of a melting-pan an adjustable dipping-trough, *e*, arranged therein, substantially as and for the uses described.

3. A dipping-trough, *e*, arranged in connection with a floating cover, or other equivalent device, whereby the trough *e* shall always contain a uniform depth of solder, substantially as described.

4. The combination of trough *e*, cover-plate *d*, pipes *s*, and nuts *u*, substantially as above set forth.

5. The cover *c*, carrying hollow posts *s'*, when combined with an adjustable dipping-trough, *e*, by adjustable connections *s*, substantially as and for the purposes set forth.

In testimony whereof I, the said JOHN GRACIE, have hereunto set my hand.

JOHN GRACIE.

Witnesses:
CHARLES LOCKHART,
G. M. MCMASTER.

(136)